United States Patent
Freisleben et al.

(10) Patent No.: US 7,850,204 B2
(45) Date of Patent: Dec. 14, 2010

(54) METHOD FOR CONTROLLING A BELT HAND-OVER DEVICE AND BELT HAND-OVER DEVICE FOR A MOTOR VEHICLE

(75) Inventors: Bernd Freisleben, Bad Staffelstein (DE); Alexander Dittrich, Ahorn (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 133 days.

(21) Appl. No.: 12/224,260

(22) PCT Filed: Feb. 14, 2007

(86) PCT No.: PCT/EP2007/001432

§ 371 (c)(1),
(2), (4) Date: Sep. 26, 2008

(87) PCT Pub. No.: WO2007/096122

PCT Pub. Date: Aug. 30, 2007

(65) Prior Publication Data

US 2009/0127840 A1     May 21, 2009

(30) Foreign Application Priority Data

Feb. 23, 2006    (DE) ................. 10 2006 008 930

(51) Int. Cl.
*B60R 22/00* (2006.01)
(52) U.S. Cl. .................................. 280/801.1
(58) Field of Classification Search ............ 280/801.1; 297/473, 481
See application file for complete search history.

(56) References Cited

U.S. PATENT DOCUMENTS 4,589,680 A     5/1986  Gurtler et al.
6,279,954 B1 *  8/2001  Townsend et al. ........ 280/801.1

(Continued)

FOREIGN PATENT DOCUMENTS

DE          33 02 163 A1     8/1984

(Continued)

OTHER PUBLICATIONS

International Search Report, dated Jun. 20, 2007, corresponding to PCT/EP2007/001432.

(Continued)

*Primary Examiner*—Faye M. Fleming
(74) *Attorney, Agent, or Firm*—Christie, Parker & Hale, LLP

(57) ABSTRACT

A method for controlling a belt hand-over device during a delivery movement for taking up and delivering a seat belt into a presentation position ergonomically favorable for a user includes extending a belt finger taking up the seat belt into an extended position substantially oriented transversely to the moving path of the belt hand-over device, and during a return movement, retracting the belt finger into a retracted position substantially coinciding with the moving path and wherein the belt hand-over device is moved in a rest position. The extending and retraction of the belt finger during the delivery and return movements of the belt hand-over device are triggered at different positions in the moving path of the belt hand-over device between the rest position and the presentation position.

18 Claims, 12 Drawing Sheets

U.S. PATENT DOCUMENTS

| | | | |
|---|---|---|---|
| 6,308,986 B1 * | 10/2001 | Townsend et al. | 280/807 |
| 7,686,338 B2 * | 3/2010 | Dallwig et al. | 280/801.1 |
| 2001/0040369 A1 | 11/2001 | Townsend et al. | |

FOREIGN PATENT DOCUMENTS

| | | |
|---|---|---|
| DE | 35 37 089 A1 | 4/1987 |
| DE | 199 01 276 A1 | 7/2000 |
| DE | 10 2005 017 750 A1 | 10/2006 |
| GB | 2 235 361 A | 3/1991 |
| GB | 2 235 362 A | 3/1991 |

OTHER PUBLICATIONS

English translation of International Preliminary Report on Patentability dated Oct. 23, 2008 for corresponding PCT application No. PCT/EP2007/001432.

* cited by examiner

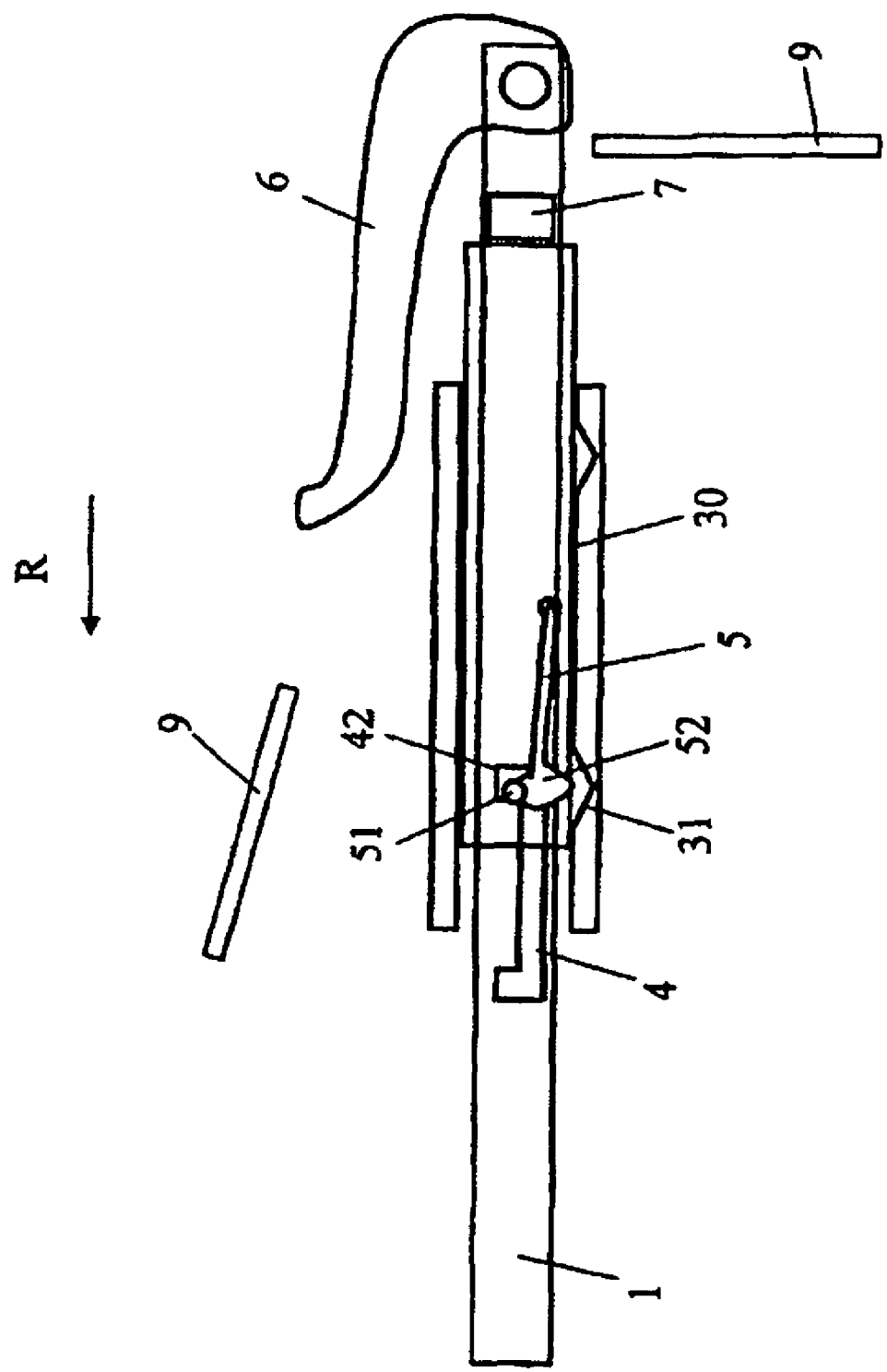

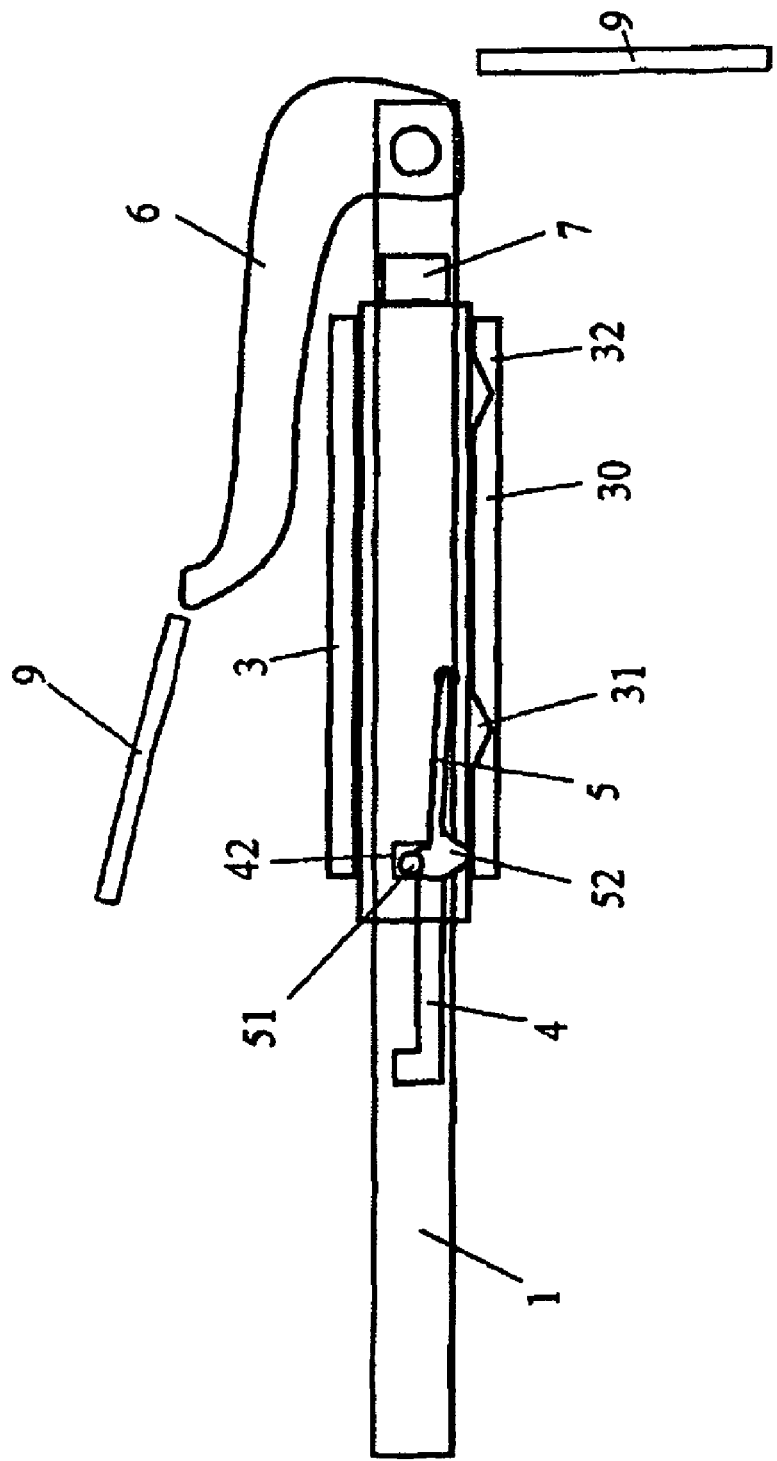

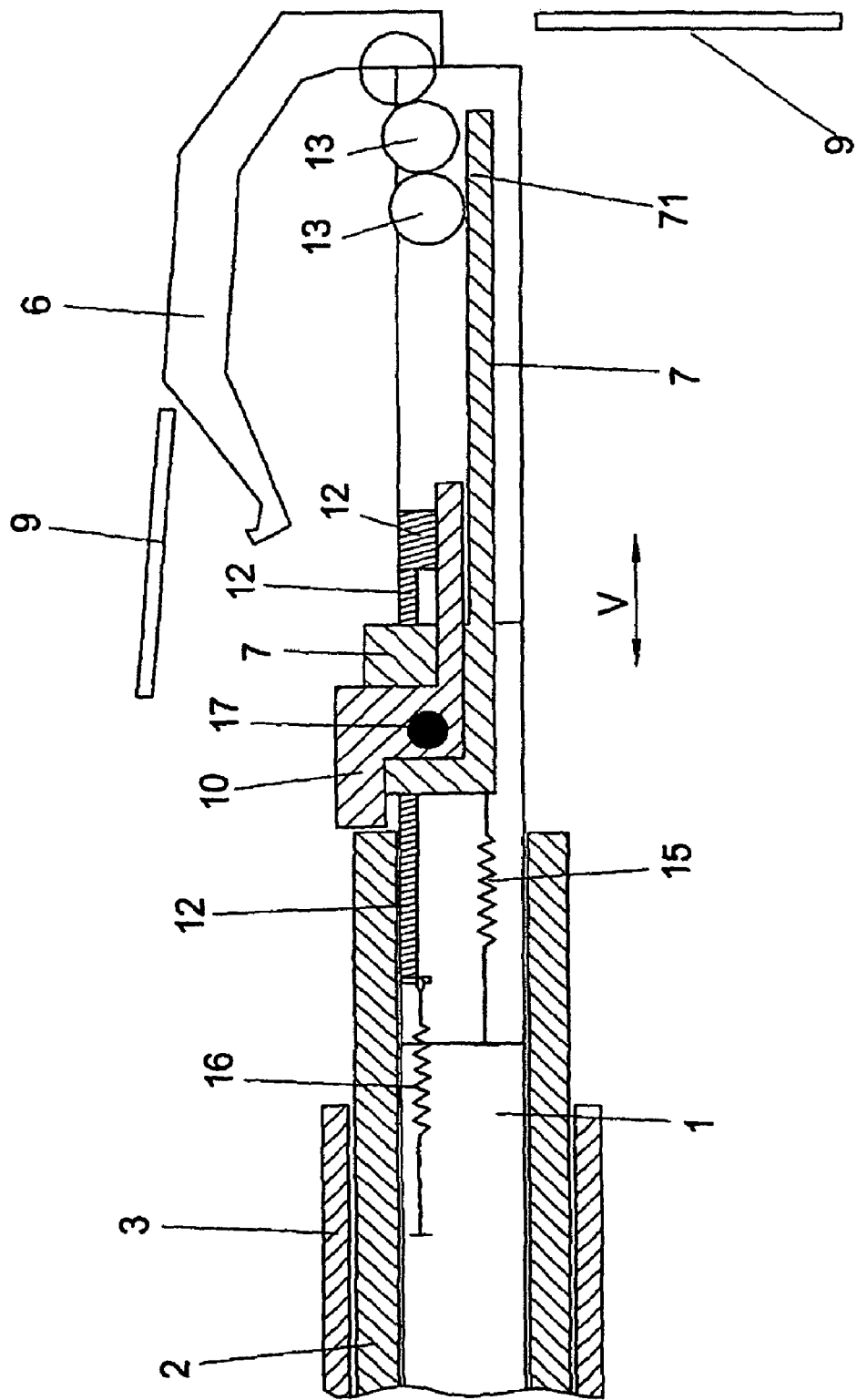

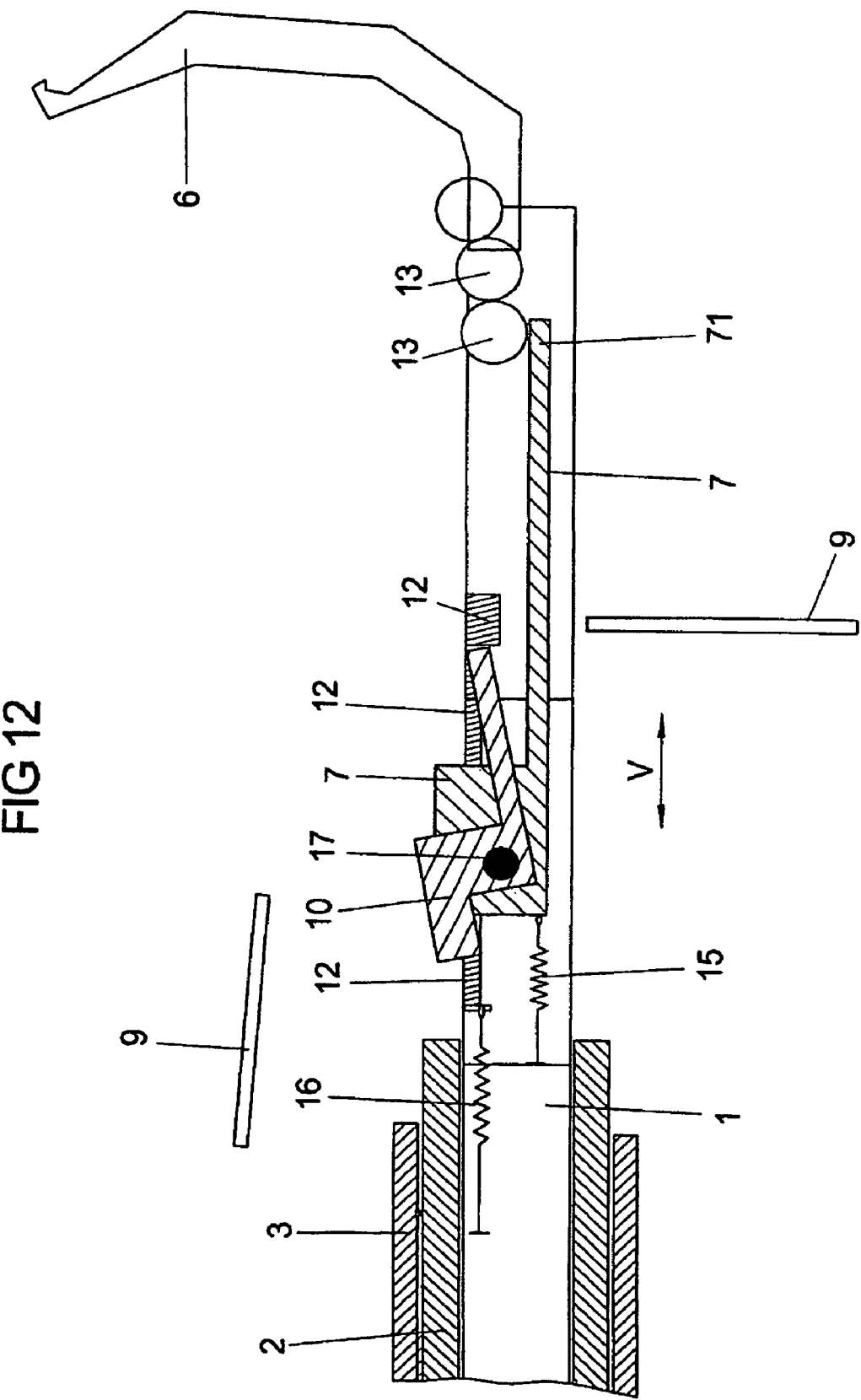

METHOD FOR CONTROLLING A BELT HAND-OVER DEVICE AND BELT HAND-OVER DEVICE FOR A MOTOR VEHICLE

CROSS-REFERENCE TO A RELATED APPLICATION

This application is a National Phase Patent Application of International Patent Application Number PCT/EP2007/001432, filed on Feb. 14, 2007, which claims priority of German Patent Application Number 10 2006 008 930.9, filed on Feb. 23, 2006.

BACKGROUND

The invention relates to method for controlling a belt hand-over device and to a belt hand-over device for a motor vehicle.

Belt hand-over devices for motor vehicle serve to take up a seat belt held out well behind a vehicle seat, especially in convertibles or coupes, and to move it into a presentation position ergonomically favorable for the vehicle occupant, where the occupant of the vehicle can easily grasp and apply the belt. The belt hand-over device, which in a rest position is drawn back into a recess in the interior trim of the motor vehicle, comprises a belt catcher, which is arranged at the end of a feed device and which for take-up and for delivery of the seat belt by means of the feed device is moved out of the rest position in the interior trim of the motor vehicle, takes up the seat belt and moves it into the presentation position.

The belt catcher comprises a belt finger which takes up the seat belt and which, with the belt hand-over device in the rest position, before delivery of the seat belt into the presentation position commences, rests against the feed device, and a swivel device, which during the feed movement of the belt hand-over device swivels the belt finger into an extended position running transversely to the moving path, in which position the belt finger grips the seat belt with a curved catching face and through a feed movement of the feed device and moves it into the presentation position. Once the vehicle occupant has grasped and applied the seat belt or a predetermined presentation time has elapsed, the belt catcher is returned from the presentation position to the rest position by a return movement of the feed device and the belt finger moves back from the extended position aligned transversely to the moving path into a retracted position running parallel to the moving path, before the belt catcher is run into the recess in the interior trim of the motor vehicle.

The extension and retraction of the belt finger are initiated by a trigger element, which is operatively connected to the feed device. In order that the force, exerted on the belt finger of the belt catcher by the seat belt being reeled off from a retractor mechanism, will not cause the belt finger to swivel back out of the extended position into the retracted position during the delivery movement of the belt hand-over device, the belt catcher has a locking device, which locks the belt finger, extended transversely to the moving path, in the extended position at least until the belt hand-over device is fed into the presentation position.

For the belt hand-over device to function correctly, it is essential that the belt finger should take up the seat belt securely during the delivery movement into the presentation position and should not draw the seat belt into the recess in the interior trim whilst the belt hand-over device is being returned to the rest position, so that the belt hand-over device and the seat belt jam, or so that the seat belt when next operated cannot be taken up by the belt finger and brought into the presentation position. The risk of unwanted threading of the seat belt on the return movement occurs, for example, if the seat belt slips during the delivery movement, in the presentation position or during the return, or is brought into its reeled position by the vehicle occupant before the belt hand-over mechanism returns into the interior trim when the presentation time has elapsed.

In order, in particular, to prevent any unwanted threading of the belt hand-over device into the seat belt, so-called belt deflectors in the form of bands or cords are known, which are arranged separately from the belt hand-over device and which prevent the seat belt being accidentally drawn into the interior trim of the motor vehicle. These belt deflectors incur additional manufacturing and assembly costs, however, and are detrimental in terms of the overall visual impression and design of the vehicle interior.

SUMMARY

The object of the present invention is therefore to ensure a reliable take-up of the seat belt during the return movement of the belt hand-over device into the presentation position and separation of the belt hand-over device from the seat belt as the belt hand-over device returns to the rest position, at minimal design and component cost and without arranging components detached from the belt hand-over device.

The exemplary solution according to an exemplary embodiment of the invention ensures a reliable threading of the belt hand-over device in and out of the seat belt, without the arrangement of additional components such as belt deflectors in the interior of a motor vehicle, and thereby a pleasing appearance, an optimum design and a minimal cost outlay through a low component and design outlay requiring only one more component than existing belt hand-over systems.

The exemplary solution according to an exemplary embodiment of the invention encompasses the basic function in which the belt finger of the belt catcher is extended into the extended position as early as possible during the delivery movement bringing the belt hand-over device from the rest position into the presentation position and during the return movement is retracted back into the retracted position with the greatest possible interval from the rest position of the belt hand-over device, thereby on the one hand ensuring a reliable take-up of the seat belt from its readiness position and on the other preventing the seat belt being drawn into the interior trim of the motor vehicle through prompt swiveling back of the belt finger into the retracted position.

During the delivery movement bringing the belt hand-over device from the rest position into the presentation position and during the return movement of the belt hand-over device from the presentation position into the rest position, the belt finger is exemplary swiveled into its extended position or its retracted position at predetermined intervals before reaching the seat belt situated in its readiness position.

Setting default intervals in relation to the readiness position of the seat belt ensures that either the belt finger is ready to take up the seat belt or the belt finger is moved past the seat belt without the seat belt being threaded into the belt finger or, if the seat belt is incorrectly seated on the belt finger, when this is returned together with the seat belt that has not been accepted by the vehicle occupant, that the seat belt has left the belt hand-over device sufficiently in advance of the rest position.

In a further exemplary development of the method according to an exemplary embodiment of the invention the belt hand-over device is moved into a housing during the return movement, the belt finger preferably closing off flush an opening in the housing when the belt hand-over device is in the rest position, and the belt finger during the delivery movement swiveling into the extended position as it leaves the housing or immediately thereafter.

This further feature allows the belt hand-over device to be accommodated in a seated housing, preferably provided in the interior trim of the motor vehicle, with the belt hand-over device in the rest position ending up flush with the interior trim, whilst at the same time ensuring that the belt finger is extended before reaching the seat belt readiness position and is ready to take up the seat belt.

In a further exemplary development of the method according to an exemplary embodiment of the invention, the belt finger during the return movement is swiveled into the retracted position at the greatest possible interval from the housing, that is to say in extreme cases immediately after reaching the presentation position and lapsing of the presentation time, on or prior to initiation of the return movement of the belt hand-over device.

The retraction and extending of the belt finger into the retracted and extended position are exemplary triggered by means of a hysteresis control, serving to ensure that the different positions in the retraction and extending of the belt finger are reproducible, the hysteresis control feasibly being of both mechanical and electronic design.

Whilst the particular distinguishing feature of a mechanical hysteresis control is that it can be readily achieved by just one additional component compared to known belt hand-over device controls, an electronic or combined mechanical and electronic hysteresis control makes it possible to take account of additional sensor signals, such as the force acting on the belt hand-over device, the locking of the seat belt lock, actuation of a seat sensor and the like.

In order to ensure that the belt finger is not swiveled back into the retracted position under the action of the force exerted by the seat belt as it is reeled off from a retractor mechanism, even where the inventive method is employed, during the return movement of the belt hand-over device the belt finger is locked in the extended position before the seat belt is taken up, and is locked in during the return of the belt hand-over device.

In order to also allow a return of the belt hand-over device in emergency manual operation whilst the belt finger is locked, without mechanical damage to the belt hand-over device, in a further exemplary development of the method according to an exemplary embodiment of the invention the belt finger locked in the extended position can be moved to its retracted position by force exerted on the belt finger and the belt hand-over device slid manually into the rest position.

Locking the belt finger in the extended position before reaching the seat belt and overcoming the locking in emergency operation mean that the swivel element can also be retracted in a locked state by exerting a manual force. In so doing the locking is automatically cancelled during the return of the belt hand-over device, irrespective of whether it is being returned in normal operation by means of a drive or manually in emergency operation. Such a locking mechanism ensures that in the event of manual return, for example if the electrical supply should fail, the belt hand-over device is not mechanically damaged and in particular that the belt finger does not break off.

A belt hand-over device for a motor vehicle with a belt catcher for taking up and delivering a seat belt into a presentation position ergonomically favorable for a vehicle occupant, a feed device for moving the belt catcher from a rest position into the presentation position, the belt catcher comprising a belt finger rotatably articulated on the feed device, a swivel device which swivels the belt finger from a retracted position substantially coinciding with the moving path of the belt hand-over device into an extended position, substantially oriented transversely to the moving path of the belt hand-over device, and a locking device locking the belt finger in the extended position, achieves the aforementioned object in that it is characterized by a control device initiating the extension and retraction of the belt finger during the delivery and return movement of the belt hand-over device at different positions in the moving path of the belt hand-over device between the rest position and the presentation position.

The belt hand-over device according to an exemplary embodiment of the invention ensures a reliable threading of the belt hand-over device in and out of the seat belt, without the arrangement of additional components such as belt deflectors in the interior of a motor vehicle and thereby a pleasing appearance, an optimum design and a minimal cost outlay through a low component and design outlay requiring only one more component than existing belt hand-over systems. The belt catcher is here controlled so that the belt finger is extended into the extended position as early as possible during the delivery movement bringing the belt hand-over device from the rest position into the presentation position, whilst on the return movement it is retracted back into the retracted position with the greatest possible interval from the rest position of the belt hand-over device, so that a reliable take-up of the seat belt from its readiness position is ensured and the withdrawal of the seat belt into the interior trim of the motor vehicle is prevented through early swiveling back of the belt finger into the retracted position.

The control device exemplary controls a relative movement of parts of the feed device in such a way that at least a part of the feed device acts on a trigger element initiating the swiveling movements of the belt finger into the extended and retracted positions.

The action of the feed device on a trigger element initiating the swiveling movements of the belt finger into the extended and retracted positions affords a simple means of controlling the retraction and extending of the belt finger through the delivery and return movement of the feed device and thereby affords a simple mechanical or electronic control of the retraction and extending of the belt finger over the moving path of the belt hand-over device.

The control device is exemplary embodied as a hysteresis control, which during the delivery movement of the belt hand-over device initiates the extension of the belt finger into the extended position close to the rest position of the belt hand-over device and during the return movement of the belt hand-over device initiates the retraction of the belt finger into the retracted position close to the presentation position.

Configuring the control device as a hysteresis control allows the different positions for the retraction and extending of the belt finger to be fixed with any desired difference in length between the two positions and therefore makes it possible to take account of the circumstances in the moving path of the belt hand-over device and the positioning of the seat belt in its readiness position.

The hysteresis control of the control device is exemplary embodied as a mechanical link control interacting with the feed device.

Embodying the hysteresis control of the control device as a link control creates the basic prerequisite for a simple means of retracting and extending the belt finger into the predetermined retracted and extended positions, requiring the addition of a single component and interacting reliably with the feed device.

A configuration of the control device as a mechanical hysteresis control is characterized in that the link control comprises a link, which is arranged in a push rod of the feed device accommodating the belt finger and the trigger element, a driver, which interacts with the link and is articulated on a slide, arranged so that it can slide on the push rod in the moving path of the belt hand-over device and acting on the trigger element, and two notches interacting with the driver, which are arranged at an interval from one another in a sleeve-shaped guide device of the feed device positively interlocking with the slide, the belt finger being swiveled into the retracted position when the slide comes into contact with the trigger element and into the extended position in the absence of any contact between the slide and the trigger element.

Configuring the link with a section running parallel to the moving path of the belt hand-over device and cut-outs at its ends running perpendicular to the moving path of the belt hand-over device, in conjunction with notches formed as wedge-shaped indentations in the inner face of the sleeve-shaped guide device, in which a wedge-shaped cotter of the driver, rotatably articulated on the slide, engages, gives rise to a reciprocating movement of the driver for locking to the push rod or the guide device, which serves, according to a further feature of the solution according to the invention, for fixing the switching points of the hysteresis control.

In a further exemplary development of the solution according to an exemplary embodiment of the invention the driver is sprung towards the notches, thereby ensuring engagement of the driver in the notches of the guide device, serving as arresting points, during the feed movement of the push rod.

BRIEF DESCRIPTION OF THE DRAWINGS

The exemplary embodiments represented in the drawing are intended to serve in explaining the invention and further variants according to the invention. In the figures:

FIG. 9 shows a schematic representation of the belt hand-over device according to the invention during the entry movement in the rest position.

FIG. 10 shows a schematic representation of the belt hand-over device according to the invention in the fully retracted position FIG. 11 shows a schematic side view of the belt hand-over device in the rest position inside the interior trim of a motor vehicle.

FIG. 12 shows a schematic side view of the belt hand-over device in the delivery movement with belt finger swiveled into its extended position.

DETAILED DESCRIPTION

Figure 1:
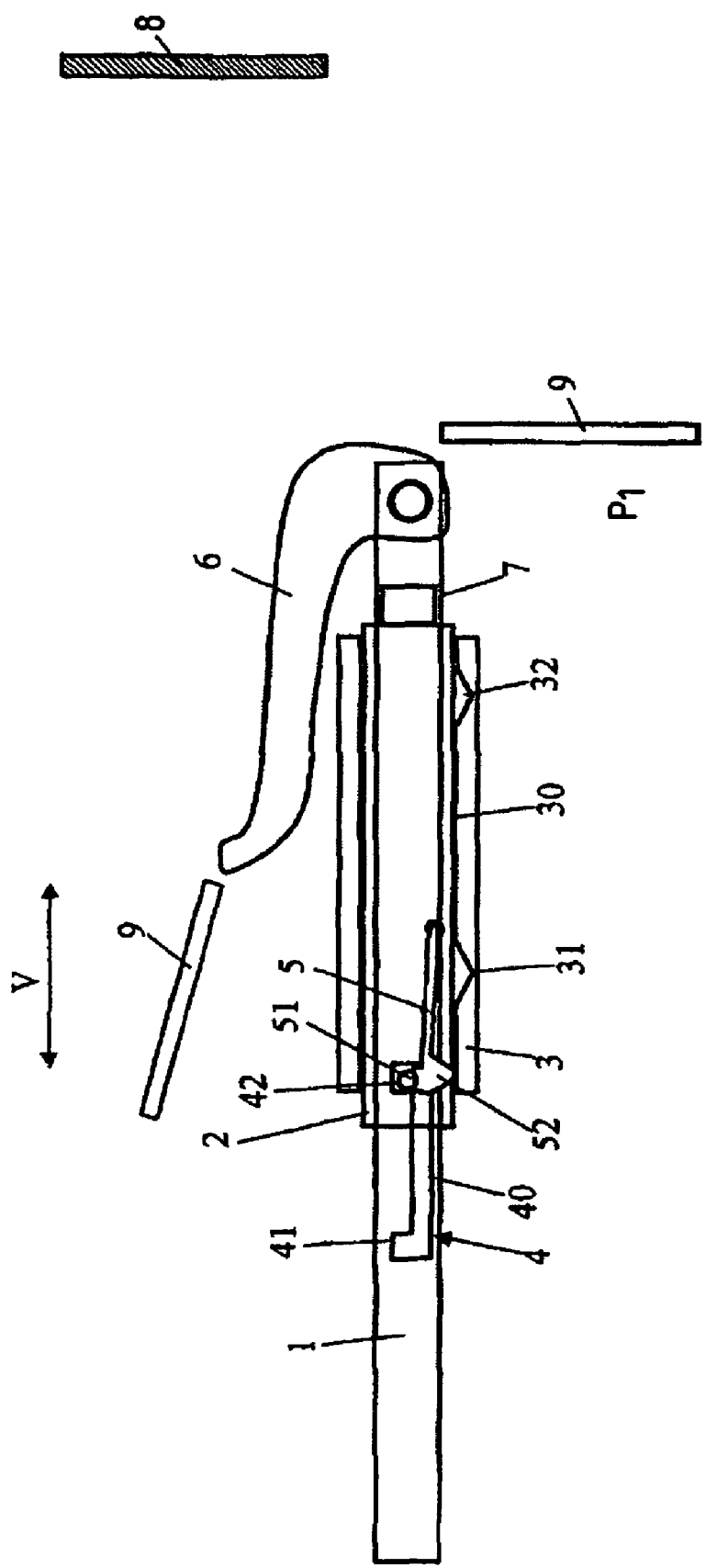
FIG. 1 shows a schematic representation of the belt hand-over device according to the invention in the rest position.

In FIGS. 1-10 the belt hand-over device according to the invention is represented schematically in various movement phases during the delivery and return movement of the belt hand-over device from its rest position $P_1$ sunk into the interior trim 9 of a motor vehicle to a presentation position $P_2$, in which the belt hand-over device presents a seat belt 8, taken up during the delivery movement, at approximately the shoulder height of a vehicle occupant and hence in an ergonomically favorable position, in order to compensate for the disadvantage in some types of vehicle such as convertibles and coupes in which the readiness position of a seat belt is situated well behind the backrest of a motor vehicle seat.

The belt hand-over device has a feed device with a push rod 1, which is driven by an electric motor and which preferably takes the form of a rack, in the longitudinal toothing of which the pinion of an electric motor-driven drive device engages, with a slide 2 sliding and positively interlocking in the longitudinal direction on the push rod 1 and with a guide device 3, which is of a sleeve-shaped design of rectangular, circular or elliptical cross section for receiving the slide 2 having a similar cross sectional profile. A belt catcher, which comprises a belt finger 6, rotatably articulated on the end of the push rod 1, and a trigger element 7, is arranged at the opposite end of the push rod 1 to the drive device of the belt hand-over device. The feed device is connected to the vehicle body by fasteners on the guide device 3, a housing-like recess being provided in an interior trim 9 of the motor vehicle to give a visually pleasing arrangement of the belt hand-over device, and the opening in the housing being closed by the belt finger 6 when the belt hand-over device is in the rest position $P_1$, in order to furnish a closed design as in FIG. 1.

At an interval from the belt hand-over device in the rest position $P_1$ thereof, a seat belt 8, likewise represented in schematic cross section, is located in its readiness position, in which a retractor mechanism holds the seat belt 8 out in tensioned form, directed approximately in the direction of the vehicle vertical axis. In order to bring the seat belt 8 out of this readiness position into the ergonomically favorable presentation position, the belt hand-over device is moved in the delivery direction V along a moving path predetermined by the guide device 3 out of the rest position $P_1$ shown in FIG. 1 in the direction of the presentation position $P_2$, and in so doing the belt finger 6 is swiveled out of its retracted position shown in FIG. 1, in which it is aligned substantially parallel to the longitudinal extent of the push rod 1, into an extended position running perpendicular thereto, in which it takes up the seat belt 8 with its catching face and moves it into the presentation position $P_2$ as the delivery movement of the push rod 1 progresses.

In order to ensure that the belt finger 6 will assume its extended position in good time before reaching the seat belt 8, and in the opposite direction of movement, as the belt hand-over device returns after leaving the presentation position $P_2$, will be swiveled back into the retracted position shown in FIG. 1 before reaching the readiness position of the seat belt 8, a control device is provided, which in this exemplary embodiment is embodied as a mechanical hysteresis control.

The mechanical hysteresis control comprises a link control with a link 4 arranged in the push rod 1, a sprung driver 5 connected to the slide 2 and notches 31, 32 for the driver 5, which are provided at an interval from one another in the inner face 30 of the guide device 3. The link 4 has a link section 40 running in the longitudinal direction of the push rod 1 and hence in the direction of the moving path of the belt hand-over device, the ends of which section comprise cut-outs 41, 42 aligned transversely to the moving path of the belt hand-over device. A pin 51 of the driver 5 engages in the link 4, whilst an opposing wedge-shaped cotter 52 of the driver 5, rotatably articulated on the slide 2, engages in the notches 31, 32 on the inner face 30 of the guide device 3 during the feed movement of the push rod 1. In order to ensure that the driver 5 engages in the notches 31, 32, it is sprung towards the inner face 30 of the guide device 3. The extending of the belt finger 6 into its extended position or the retraction of the belt finger 6 into its retracted position, running substantially parallel to the alignment of the push rod 1, as shown in FIG. 1 is controlled by a trigger element 7, on operative connection of which with the slider 2 the belt finger 6 is situated in its retracted position, whereas in the absence of any operative connection between the slide 2 and the trigger element 7, the belt finger 6 is swiveled into its extended position. An exemplary embodiment of the design of the trigger element 7 and the swivel device for swiveling the belt finger 6 into the retracted and extended positions, a locking device for securing the extended position of the belt finger 6 and a device for manual emergency actuation of the belt hand-over device in the event of a failure of or damage to the electric motor-driven drive device is represented in two different movement phases in FIGS. 11 and 12.

Starting from the rest position of the belt hand-over device shown in FIG. 1, with the belt finger 6 situated in its retracted position, the individual phases in the movement of the belt hand-over device during the delivery movement Z and the return movement R will now be explained below in relation to the extending and retraction of the belt finger 6 into its extended and retraction positions, controlled by the hysteresis control of the control device embodied as a link control.

Figure 2:
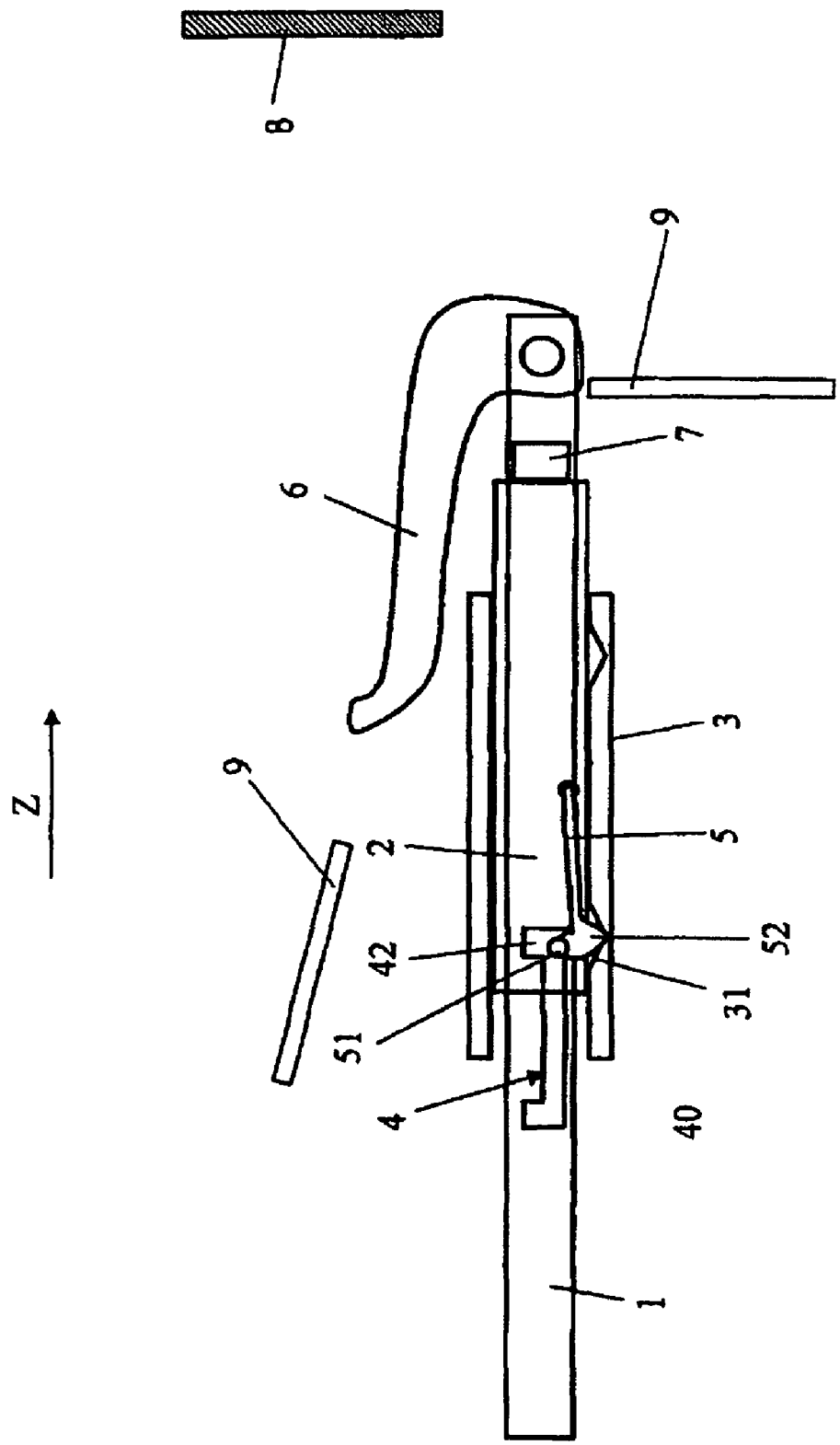
FIG. 2 shows a schematic representation of the belt hand-over device according to the invention in a movement phase during the advance in the delivery direction Z.

With the belt hand-over device in the rest position $P_1$, the pin 51 of the driver 5 is situated in the cut-out 42 of the link 4, and the wedge-shaped cotter 52 of the driver 52 is situated on the inner face 30 of the guide device 3. If the push rod 1 is driven in the delivery direction Z, the wedge-shaped cotter 52 of the driver 5 slides on the inner face 30 of the guide device 3 in the delivery direction Z until it has reached the first notch 31 in the inner face 30 of the guide device 3, as shown in FIG. 2, and due to the springing of the driver 5 towards the inner face 30 of the guide device 3 engages in the first notch 31. Throughout this movement phase of the belt hand-over device the guide device 3 is in uninterrupted contact with the trigger element 7, so that the belt finger 6 remains in its retracted position, which it has assumed whilst the belt hand-over device is in the rest position P1. As the driver 5 retracts into the first notch 31 in the inner face 30 of the guide device 3, the pin 51 of the driver 5 has been moved out of the cut-out 42 in the link 4 and is situated in the link path 40 of the link 4.

Figure 3:
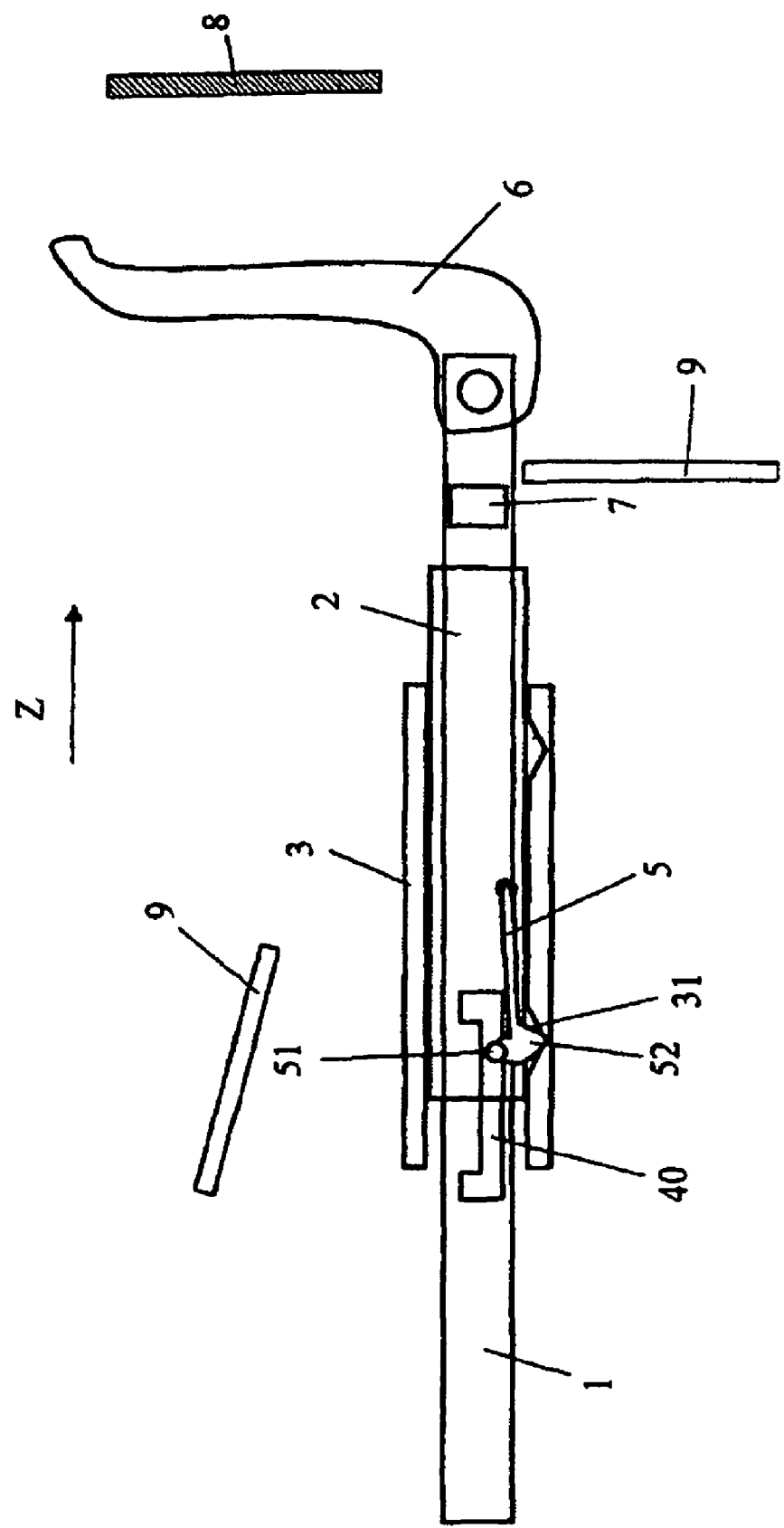
FIG. 3 shows a schematic representation of the belt hand-over device according to the invention in a movement phase during the advance in the delivery direction Z.

As the push rod 1 is advanced further in the delivery direction Z, as is represented schematically in FIG. 3 the driver 3 is arrested by the wedge-shaped cotter 52 latching in the first notch 31, so that the slide 2 stops relative to the guide device 3, thereby cancelling the operative connection between the slide 2 and the trigger element 7, so that the belt finger 6 is swiveled into its extended position. As can further be seen from the schematic representation in FIG. 3, the belt finger 6 is here still situated at a sufficient interval from the seat belt 8 in its readiness position.

Figure 4:
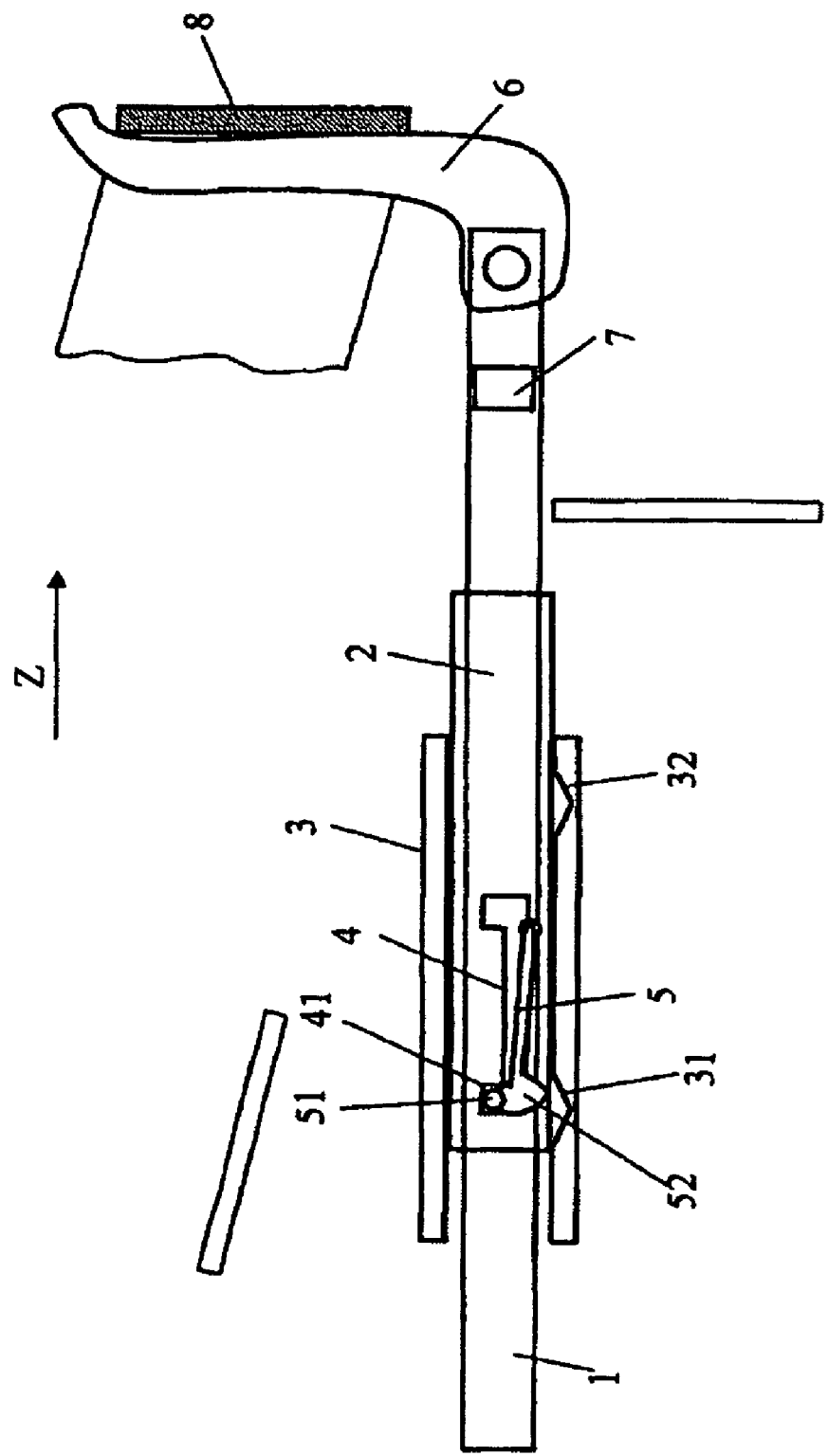
FIG. 4 shows a schematic representation of the belt hand-over device according to the invention in a movement phase during the advance in the delivery direction Z.

As the push rod 1 advances further in the delivery direction Z, the driver pin 51 as shown in FIG. 4 reaches the end of the link path 40, so that the slide 2 is carried in the delivery direction Z by the advancing movement of the push rod 1, and the wedge-shaped cotter 52 of the driver 5 is moved out of the first notch 31, the cut-out 41 at the end of the link section 40 allowing a swiveling movement of the driver in order to remove the wedge shaped cotter 52. FIG. 4 shows a schematic representation of this movement phase of the belt hand-over device during the advance in the delivery direction Z, in which the belt finger 6 has taken up the seat belt 8 and carries it into the presentation position as the delivery movement progresses.

Figure 5:
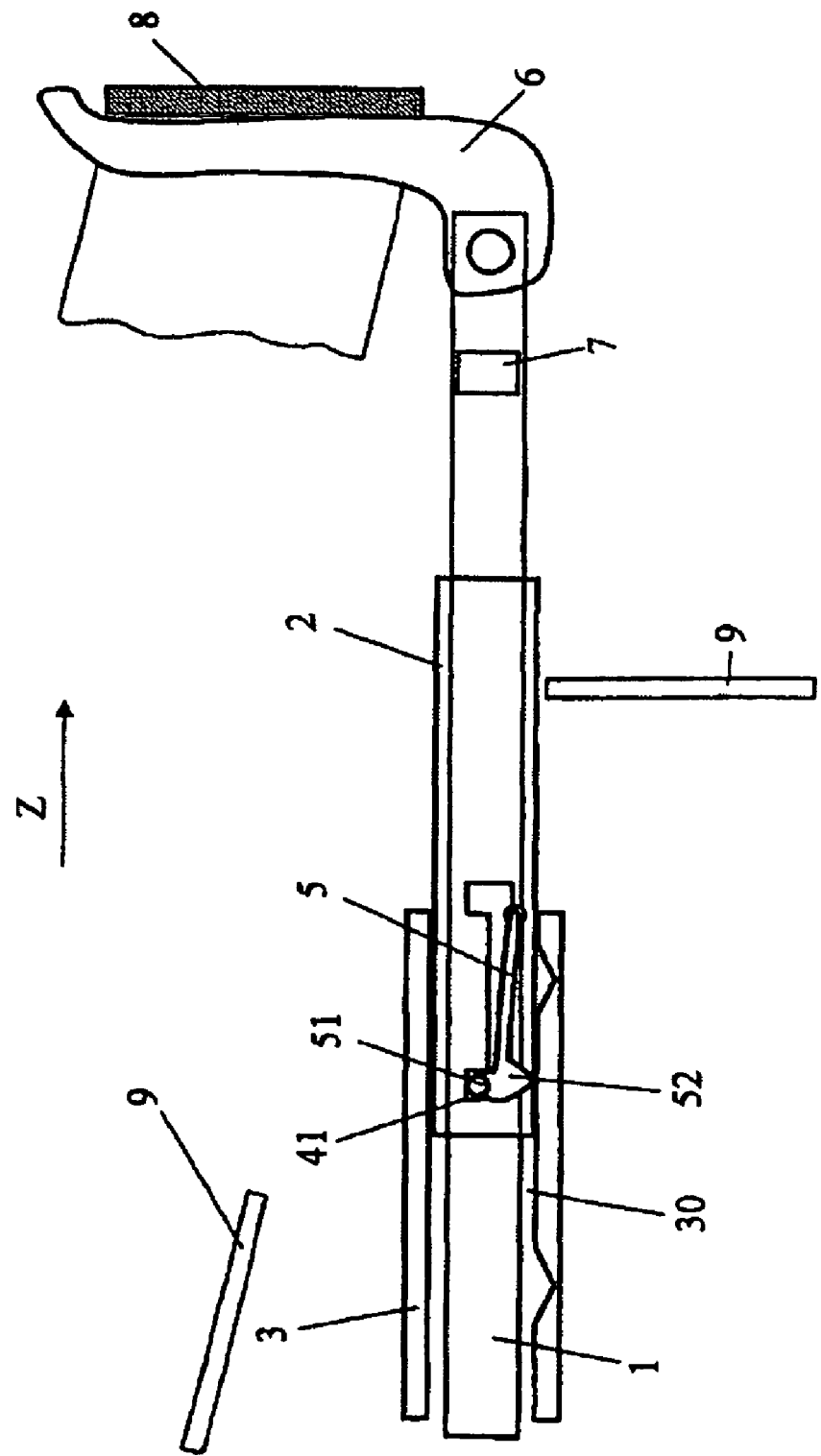
FIG. 5 shows a schematic representation of the belt hand-over device according to the invention in a movement phase during the advance in the delivery direction Z.
Figure 6:
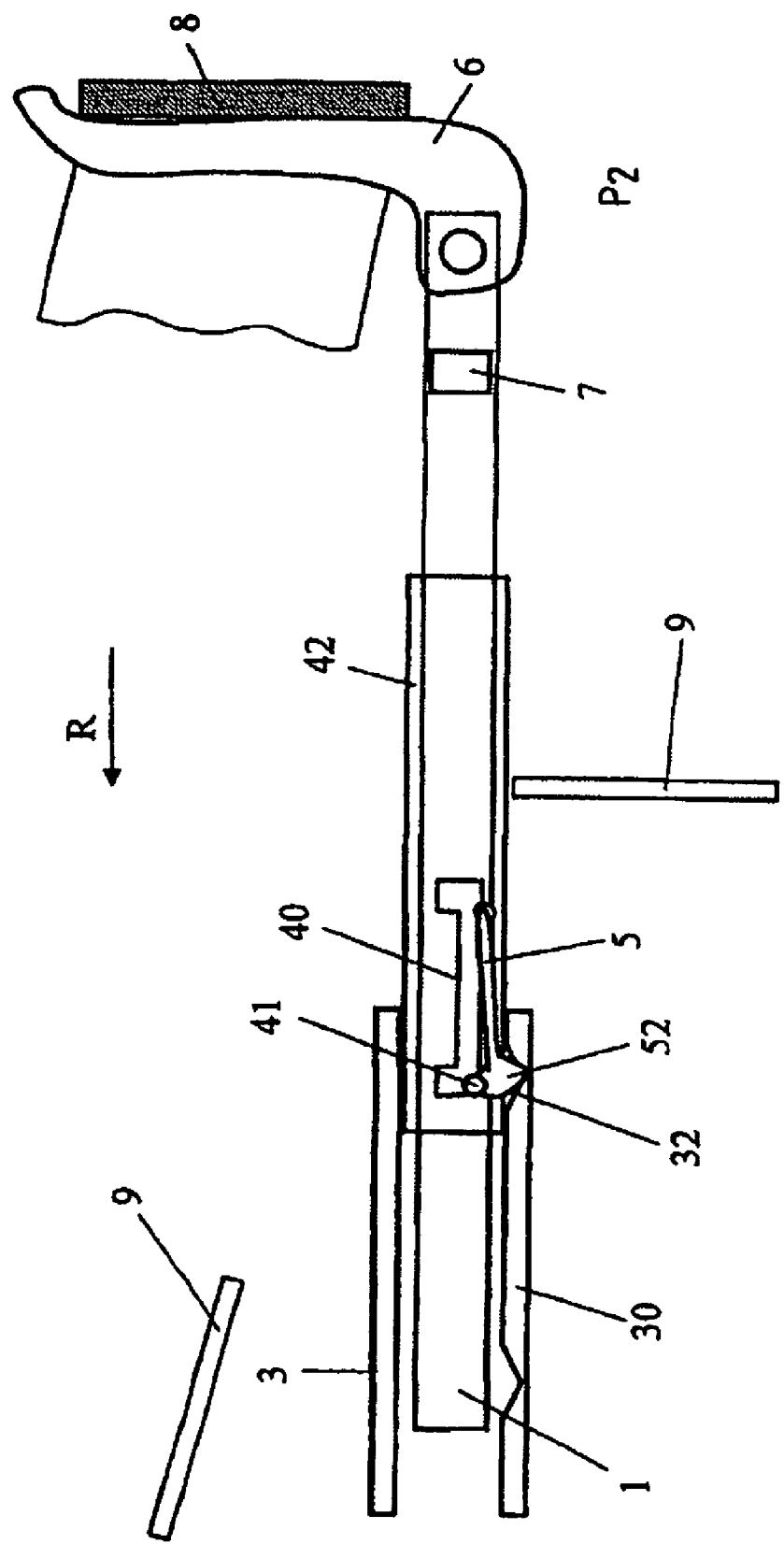
FIG. 6 shows a schematic representation of the belt hand-over device according to the invention in the presentation position.

The driver pin 51 of the driver 5 lodged in the cut-out 41 in the link 4, as shown in FIG. 5, causes the slide 2 to be carried along as the advance movement of the push rod 1 continues, the wedge-shaped cotter 52 of the driver 5 sliding along the inner face 30 of the guide device 3 until it drops into the second wedge-shaped notch 32 at the maximum advance of the push rod 1 represented schematically in FIG. 6. On completion of the delivery movement of the push rod 1 and the slide 3, the presentation position $P_2$ of the belt hand-over device is reached, in which position the vehicle occupant can accept the seat belt 8 from the belt hand-over device and apply it, or the belt hand-over device holds the seat belt 8 out for acceptance for a predetermined presentation time before it returns to the rest position $P_1$.

Figure 7:
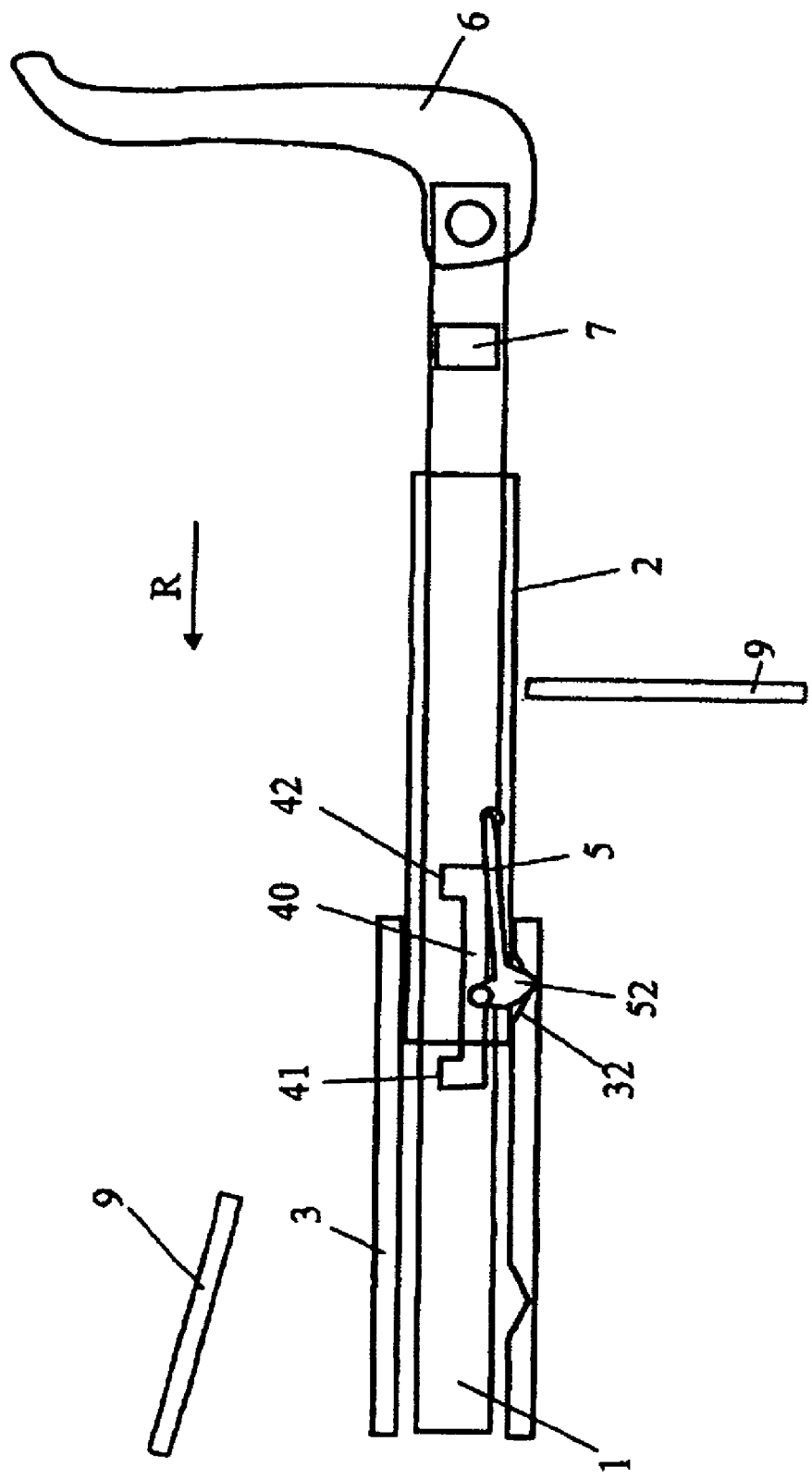
FIG. 7 shows a schematic representation of the belt hand-over device according to the invention in a movement phase during the advance in the return direction R.
Figure 8:
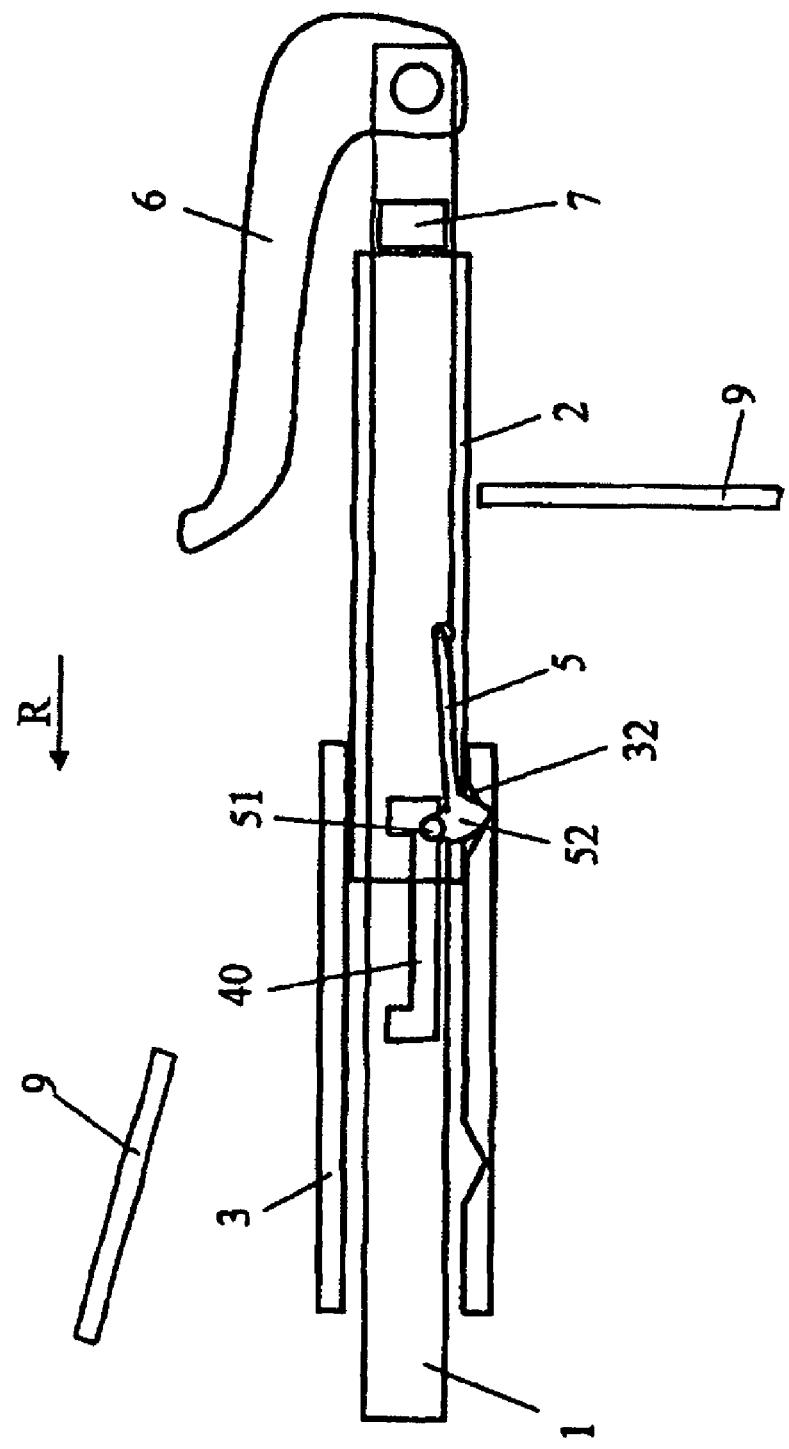
FIG. 8 shows a schematic representation of the belt hand-over device according to the invention in a movement phase during the advance in the return direction R.

On initiation of the movement bringing the belt hand-over device in the return direction R, represented schematically in FIG. 7, the slide 2 remains in its extreme extended position, due to the latching of the cotter 52 of the driver 5 in the second notch 32, whilst the push rod 1 initiates the return movement, so that the link path 40 slides along the driver pin 51 of the driver 5, as shown in FIG. 7, until the driver pin 51 of the driver 5 is situated in the area of the cut-out 42 in the link 4, as shown in FIG. 8, in which position the slide 2 again enters into operative connection with the trigger element 7, so that the belt finger 6 is swiveled back into its retracted position.

Since the driver pin 51 can slide in the cut-out 42 in the link 4, the wedge-shaped cotter 52 of the driver 5 is carried out of the second wedge-shaped notch 32 and as in the movement phase according to FIG. 5 is moved along the inner face 30 of the guide device 3 during the return movement R of the belt hand-over device, until it has reached the end of the link path 40 and hence the cut-out 42, as shown in FIG. 9, where it can again drop into the first notch 31 on the inner face 30 of the guide device 3.

Throughout the movement phase when the slide 2 is in contact with the trigger element 7, as shown in FIG. 8, to the entry movement of the belt hand-over device into the rest position $P_1$, as shown in FIG. 9, the belt finger 6 is being retracted into its retracted position so that, regardless of the position of the seat belt 8 or its connection to the belt finger 6, it is ensured that either the belt finger 6 is moved past the seat belt 8 situated in its readiness position or the seat belt 8 has left the belt finger 6.

As the return movement of the push rod 1 progresses, the driver 5 with its driver pin 51 remains in the cut-out 42 in the link 4 even with transient engagement in the first notch 31 (since the driver 5 is sprung towards the inner face of the guide device 3) until the belt hand-over device has reached its fully retracted limit position, represented schematically in FIG. 10, which coincides with the rest position $P_1$ shown in FIG. 1.

As an alternative to the mechanical hysteresis control shown in FIGS. 1 to 10, an electronic hysteresis control may be provided, which determines the switching points for retraction and extending of the belt finger by means of a path control or with sensor elements coupled to the feed device.

FIGS. 11 and 12 show a schematic side view of the belt hand-over device in the area of the belt catcher with the belt finger 6 retracted and with it extended, in order to explain the construction and function of the trigger device, the swivel device, the locking device and the emergency operation device.

FIG. 11 shows the belt hand-over device in the rest position before the commencement of delivery, in which the push rod 1 is run into the interior trim 9 and is covered by the interior trim 9. From the motor vehicle interior, the only part of the belt hand-over device visible with the belt hand-over device in this position is the outside of the belt finger 6 of the belt catcher, arranged at the front end of the push rod 1, the finger substantially closing off the opening in the interior trim 9. The push rod 1 of the belt hand-over device is enclosed over part of its length by the slide 2 and this is enclosed by the guide device 3, which serves to fix the belt hand-over device to the motor vehicle body and on which a motor and a transmission mechanism connected to the motor are arranged, which serve as drive for delivering and returning the push rod 1 and its slide 2, connected to the push rod 1 via the link control as shown in FIGS. 1 to 10. Whilst the belt hand-over device is being delivered, the push rod 1 moves through the opening in the interior trim 9, grasps the seat belt with the belt catcher and brings the belt into the presentation position, in which a person sitting on a vehicle seat can easily grasp the seat belt in order to belt up.

The belt catcher has a swivel device with the belt finger 6, which during delivery is swiveled in the direction of movement into the extended position running transversely to the moving path and grips the seat belt. The swiveling of the belt finger 6 during the delivery and return—as has been explained above with reference to FIGS. 1 to 10—is triggered by the trigger element 7 and is performed by the swivel device, which is designed so that both the extending of the belt finger 6 into the extended position and the retraction of the belt finger 6 into the retracted position are controlled by the delivery and return movement of the push rod 1.

The swivel device comprises a locking device, which serves to lock the belt finger 6 in the extended position, so that the belt finger 6 cannot possibly be retracted under the force exerted by the seat belt. The operating principle of the swivel device and the locking device will be explained in more detail below.

The swivel device operatively connected to the trigger element 7 is formed by multiple displaceable elements and mechanical springs and has a locking element 10 and a stop element 12a, 12b, which are arranged substantially parallel to the push rod 1. The trigger element 7 and the stop element 12a, 12b are connected to the push rod 1 by two spring elements 15, 16 in the form of extension springs and can be displaced parallel to the push rod 1. The locking element 10 is connected by way of a pivot 17 to the trigger element 7 in such a way that it is capable of swiveling about the pivot 17. With the belt hand-over device in the rest position, the locking element 10 extends substantially parallel to the displacement axis V and is non-positively connected to the one end of the trigger element 7. In addition the locking element 10 is biased in a counter-clockwise direction in relation to the trigger element 7 by a torsion or bending spring not shown in FIG. 11.

In the rest position, before delivery commences, the extension spring 15 connected to the trigger element 7 is in the maximum extended state. The trigger element 7 is thereby biased via the non-positive connection of the slide 2 to the locking element 10, which is connected to the trigger element 7 via the pivot 17, and is held in a maximum extended position in the delivery direction Z relative to the push rod 1.

The trigger element 7 comprises a coupling area in the form of a first toothed segment section 71, which extends along the displacement axis V on a rectilinear section of the trigger element 7. This toothed segment section 71 meshes in a mechanism formed from two pinions 13a, 13b, which in turn meshes in a coupling section of the belt finger 6 in the form of a second toothed segment section 61. The pinions 13a, 13b and the belt finger 6 are each rotatably supported by way of a pivot fixed in relation to the push rod 1. The second toothed segment section 61, which meshes in the second pinion 13b, extends along a circular section radially separated from the pivot of the belt finger 6.

The non-positive connection between the slide 2 and the locking element 10 and the coupling of the locking element 10 to the trigger element 7 by way of the pivot 17 mean that the pressure of the slide 2, determined by the link control, acts counter to the spring force of the extension spring 15, so that the slide 2 presses the trigger element 7 along the displacement axis V into a rest position, in which the trigger element 7 is maximally extended in the delivery direction Z relative to the push rod 1, and holds the belt finger 6 in the retracted position by means of the pinions 13a, 13b. The rest position of the trigger element 7 may here be defined by a mechanical stop, which limits the deflection of the trigger element 7 and consequently also the extension of the extension spring 15. In the rest position of the trigger element, the teeth of the pinion 13a mesh in the starting area of the linear toothed segment section 71 facing the extension spring 15.

In the rest position the locking element 10 extends substantially parallel to the displacement axis V of the trigger element 7 and here lies on the stop element 12a, 12b. The stop element is constructed in two parts from a stop 12a and a straight guide 12b, which are so connected to one another, however, that they form one unit. The extension spring 16 connected to the straight guide 12b of the stop element 12a, 12b is relaxed in the rest position. The displacement travel of the stop element 12a, 12b may be limited in both directions along the displacement axis V by means of mechanical stops.

When the push rod 1 is moved out of the rest position shown in FIG. 11, the slide 2 will follow in the delivery direction Z via the link control of the push rod 1 and in so doing will for the time being maintain the non-positive connection to the locking element 10 and hence also to the trigger element 7.

Whilst the push rod continues to move in the delivery direction, the link control will cancel the non-positive contact of the slide 2 with the locking element 10 and thereby with the trigger element 7, and under the action of the extension spring 15 will displace the trigger element 7 relative to the push rod 1, counter to the delivery direction Z. Owing to the operative connection of the trigger element 7 to the pinions 13a, 13b and of the pinions 13a, 13b to the belt finger 6, the displacement of the trigger element 7 causes the pinions 13a, 13b to rotate, thereby causing the belt finger 6 to swivel into the extended position running transversely to the moving path of the belt catcher, as shown in FIG. 12.

On reaching the extended position, the first pinion 13a engages in the end section of the toothed segment section 71 on the trigger element 7 remote from the extension spring 15, as is shown in FIG. 12, and the swiveling of the belt finger 6 is completed. For precise fixing of the extended position, the maximum deflection of the belt finger 6 may be limited by a mechanical stop between the belt finger 6 and the push rod 1, for example.

The displacement of the trigger element 7 during the swiveling sequence of the belt finger 6 will also have caused the locking element 10 to be displaced relative to the stop element 12a, 12b. As soon as the belt finger 6 has reached the extended position, the locking element 10 is no longer supported by the stop element 12a, and due to the biasing produced by a torsion or bending spring in relation to the trigger element 7, it is rotated about the pivot 17 relative to the trigger element 7, so that the end of the locking element 10 facing the belt finger 6 comes to lie in front of the stop element 12a, viewed in the delivery direction Z. Because the stop element 12a, 12b is held in position relative to the push rod 1 by the spring force of the extension spring 16, the locking element 10 and therefore also the trigger element 7 are locked in the delivery direction Z relative to the push rod 1. In this way the belt finger 6 is locked and as delivery progresses cannot be retracted by the force of the seat belt acting on the belt finger 6.

In normal return of the push rod 1, driven by the motor drive, the swiveling sequence of the belt finger 6 is reversed. During the return, the slide 2, controlled by the link control, enters into a non-positive connection with the locking element 10, thus causing the latter to rotate out of the angular setting in the locking position back into its starting position, so that it is no longer locked by the stop element 12a, and the belt finger 6 is released. At the same time the trigger element 7, under the action of the extension spring 15, is drawn back into the position likewise shown in FIG. 11 and the trigger element 7, non-positively connected to the slide 2 via the locking element 10, is displaced relative to the push rod 1 in the direction counter to the return direction R, and the belt finger 6 is retracted into its retracted position.

For explanation of a manual return of the push rod 1, for example in emergency operation should the electrical supply fail, attention is drawn to the description in DE 10 2005 017750.6, to which reference is made in this context.

The invention claimed is:

1. A method for controlling a belt hand-over device during a delivery movement of the belt hand-over device for taking up and delivering a seat belt into a presentation position ergonomically favorable for a user, the method comprising extending a belt finger taking up the seat belt during a delivery movement of the belt hand-over device, wherein the belt finger is extended into an extended position substantially oriented transversely to a moving path of the belt hand-over device, and retracting the belt finger during a return movement of the belt hand-over device, wherein the belt finger is retracted into a retracted position substantially coinciding with the moving path and wherein the belt hand-over device is moved to a rest position, wherein the extending and retracting of the belt finger during the delivery and return movements of the belt hand-over device are triggered at different positions in the moving path of the belt hand-over device between the rest position and the presentation position.

2. The method of claim 1, wherein during the delivery movement bringing the belt hand-over device from the rest position into the presentation position and during the return movement of the belt hand-over device from the presentation position into the rest position, the belt finger is swiveled into its extended position or its retracted position at predetermined intervals before reaching the seat belt situated in a seat belt readiness position.

3. The method of claim 1, wherein the belt hand-over device is moved into a housing during the return movement, wherein the belt finger seals off flush an opening in the housing when the belt hand-over device is in the rest position, and wherein the belt finger during the delivery movement is swiveled into the extended position as the belt finger leaves the housing or immediately upon leaving the housing.

4. The method of claim 2, wherein in the return movement the belt finger is swiveled into the retracted position at a greatest possible interval from the housing.

5. The method of claim 3, wherein the retraction and extending of the belt finger into the retracted and extended positions, respectively, are triggered with a hysteresis control.

6. The method of claim 5, wherein the hysteresis control is at least one of a mechanical and electronic hysteresis control.

7. The method of claim 1, wherein in the return movement of the belt hand-over device, the belt finger is locked in the extended position before the seat belt is taken up, and is locked during the return of the belt hand-over device.

8. The method of in claim 7, wherein the belt finger locked in the extended position is moveable to the retracted position by force exerted on the belt finger and the belt hand-over device slid manually into the rest position.

9. A belt hand-over device for a motor vehicle comprising:
a belt catcher for taking up and delivering a seat belt into a presentation position ergonomically favorable for a vehicle occupant;
a feed device for moving the belt catcher from a rest position into the presentation position, the belt catcher comprising:
a belt finger rotatably articulated on the feed device;
a swivel device configured to swivel the belt finger from a retracted position substantially coinciding with a moving path of the belt hand-over device into an extended position substantially oriented transversely to the moving path of the belt hand-over device; and
a locking device locking the belt finger in the extended position;
a control device initiating the extension and retraction of the belt finger during the delivery and return movement of the belt hand-over device at different positions in the moving path of the belt hand-over device between the rest position and the presentation position.

10. The belt hand-over device of claim 9, wherein the control device controls a relative movement of parts of the feed device in such a way that at least a part of the feed device acts on a trigger element initiating the swiveling movements of the belt finger into the extended and retracted positions.

11. The belt hand-over device of claim 9, wherein the control device comprises a hysteresis control, which during the delivery movement of the belt hand-over device initiates the extension of the belt finger into the extended position close to the rest position of the belt hand-over device and during the return movement of the belt hand-over device initiates the retraction of the belt finger into the retracted position close to the presentation position.

12. The belt hand-over device of claim 11, wherein the control device controls a relative movement of parts of the feed device in such a way that at least a part of the feed device acts on a trigger element initiating the swiveling movements of the belt finger into the extended and retracted positions, and wherein the hysteresis control of the control device comprises a link control interacting with the feed device.

13. The belt hand-over device of claim 12, wherein the link control comprises:
a link arranged in a push rod of the feed device accommodating the belt finger and a trigger element;
a driver interacting with the link and articulated on a slide, the slide being arranged so as to be slidable on the push rod in the moving path of the belt hand-over device and acting on the trigger element; and two notches interacting with the driver and arranged at an interval from one another in a sleeve-shaped guide device of the feed device positively interlocking with the slide.

14. The belt hand-over device of claim 13, wherein the belt finger is swiveled into the retracted position when the slide comes into contact with the trigger element and into the extended position in the absence of any contact between the slide and the trigger element.

15. The belt hand-over device of claim 13, wherein the link has a link section running parallel to the moving path of the belt hand-over device, the link section having ends having section cut-outs arranged running perpendicular to the moving path of the belt hand-over device.

16. The belt hand-over device of claim 13, wherein the notches are formed as wedge-shaped indentations in an inner face of the sleeve-shaped guide device, wherein a wedge-shaped cotter of the driver being rotatably articulated on the slide engages in the wedge-shaped indentations.

17. The belt hand-over device of claim 13, wherein the driver is sprung towards an inner face of the sleeve-shaped guide device.

18. The belt hand-over device of claim 13, wherein a reciprocal spacing of the notches and a length of the link section determine a switching points of the hysteresis control.

* * * * *